3,517,035
2-OXA-5β-CYANOANDROSTANE DERIVATIVES
Seymour D. Levine, North Brunswick, N.J., assignor to
E. R. Squibb & Sons, Inc., New York, N.Y., a corporation of Delaware
No Drawing. Filed June 18, 1968, Ser. No. 737,840
Int. Cl. C07d 7/24, 7/46
U.S. Cl. 260—343.2                                  6 Claims

ABSTRACT OF THE DISCLOSURE

This disclosure relates to androstanes having an oxygen atom in the 2-position and a cyano substituent at the 5-position. These compounds possess anti-androgenic activity.

---

This invention relates to androstanes having the following formulae:

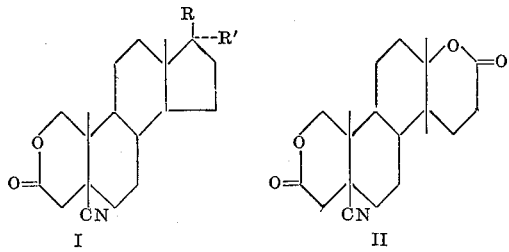

wherein R' is hydrogen; R is hydroxy and acyloxy; and together R and R' is oxo (O=).

As anti-androgens, the final products of this invention have been found to be useful in veterinary medicine. Male swine, the meat of which is usually rendered unpalatable by a characteristic odor developed by the mature animal which permeates the meat, may be treated with the final products of this invention in order to suppress the formation of the odor and hence render the meat more palatable. Likewise the caponizing of male chickens may be achieved without resort to castration by means of administration of the final products of this invention. For these purposes they may be administered orally at a dosage of about 10 to 200 mg./kg. of body weight daily, or parenterally at a dosage of about 2 to 60 mg./kg. of body weight daily.

The compounds of this invention are prepared by utilizing 5β-cyano-17β-hydroxy-A-norandrostane-2-one as the starting material. This starting material is subjected to a Baeyer-Villiger reaction, utilizing peroxytrifluoroacetic acid as the peracid. The novel intermediate compound formed as a result of this reaction is 2-oxa-5β-cyano-17β-trifluoroacetoxyandrostane-3-one. This novel intermediate is then subjected to hydrolysis, utilizing a base, such as sodium hydroxide in dioxane or potassium carbonate or sodium carbonate in methanol.

The hydrolyzed product, 2-oxa-5β-cyano-17β-hydroxyandrostane-3-one, is then oxidized with an oxidizing agent, such as Jones reagent (e.g., chromium trioxide-sulfuric acid). This reaction yields the oxidized product, 2-oxa-5β-cyanoandrostane-3,17-dione, which is then subjected to a Baeyer-Villiger reaction to form 2,17α-dioxa-5β-cyano-D-homoandrostane-3,17-dione one of the end products of the instant invention. Suitable peracids for this reaction include perbenzoic acid, peracetic acid, m-chloroperbenzoic acid, and peroxytrifluoroacetic acid.

If the 17-acyloxy is desired, the hydrolyzed product, 2-oxa-5β-cyano-17β-hydroxyandrostane-3-one can be esterified in the usual manner, as by treatment with the desired acid anhydride or acyl halide in an organic solvent (preferably in an organic base, such as pyridine).

Thus, to prepare the 17-acyloxy derivatives wherein the acyl radical corresponds to the acyl radical of a hydrocarbon carboxylic acid of less than ten carbon atoms, either the acyl halide or acid anhydride of a lower alkanoic acid (e.g., acetic, propionic and tert-butyric acid), a monocyclic aryl carboxylic acid (e.g., benzoic and toluic acid), a monocyclic aryl lower alkanoic acid (e.g., phenacetic and β-phenylpropionic acid), a lower alkanoic acid, a cycloalkanecarboxylic acid, or a cycloalkenecarboxylic acid is employed as a reactant.

The following examples illustrate the instant invention, all temperatures are in degrees centigrade, unless otherwise specified:

EXAMPLE 1

2-oxa-5β-cyano-17β-trifluoroacetoxyandrostane-3-one

A mixture of 400 mg. of 5β-cyano-17β-hydroxy-A-norandrostane-2-one, and 250 mg. of disodium hydrogen phosphate in 15 ml. of methylene chloride is treated with an excess of peroxytrifluoroacetic acid and stirred at room temperature for three days. The mixture is washed with 8% salt solution, 5% potassium iodide solution, 10% sodium bisulfite solution, dried and evaporated to dryness. The residue is crystallized from chloroform-isopropyl ether to give 318 mg. of 2-oxa-5β-cyano-17β-trifluoroacetoxy-androstane-3-one, M.P. 161–163°. The analytical sample is prepared by recrystallization from chloroform-isopropyl ether, M.P. 168.5–169°; $[\alpha]_D^{23}+20°$ (EtOH); $\lambda^{KBr}$ 4.48; 5.62 and 5.75 mµ;

$\tau^{TMS}_{CDCl_3}$ 9.13 (s, 18-Me), 8.81 (s, 19-Me), 7.06 (s, 4-CH$_2$), 5.75 (s, 1-CH$_2$) and 5.25 (m, 17α-H)

Analysis.—Calc'd for $C_{21}H_{26}FNO_4$ (414.43) (percent): C, 61.01; H, 6.34; N, 3.39; F, 13.78. Found (percent): C, 60.90; H, 5.90; N, 3.35; F, 13.91.

EXAMPLE 2

2-oxa-5β-cyano-17β-hydroxyandrostane-3-one

A solution of 150 mg. of 2-oxa-5β-cyano-17β-trifluoroacetoxyandrostane-3-one in 15 ml. of methanol is treated with 1.5 ml. of 10% potassium carbonate solution and stirred at room temperature for 4.5 hours. The mixture is acidified with acetic acid, concentrated and diluted with water. The aqueous phase is extracted with chloroform. The chloroform extracts are washed with 8% salt solution, dried and evaporated to give 2-oxa-5β-cyano-17β-hydroxyandrostane-3-one, $\tau^{TMS}_{CDCl_3}$ 9.23 (s, 18-Me), 8.80 (s, 19-Me), 7.03 (s, 4-CH$_2$), 6.34 (m, 17α-H) and 5.71 (s, 1-CH$_2$)

EXAMPLE 3

2-oxa-5β-cyanoandrostane-3,17-dione

A solution of 2.9 g. of 2-oxa-5β-cyano-17β-hydroxyandrostane-3-one in 70 ml. of acetone is treated with an excess of chromium trioxide-sulfuric acid. Methanol is added, and the suspension filtered through Hy-flo. The filtrate is concentrated, diluted with water and the precipitate collected by filtration to give 1.8 g. of 2-oxa-5β-cyanoandrostane-3,17-dione, M.P. 232–234°. The analytical sample is prepared by recrystallization from methanol-isopropyl ether; M.P. 237–238°; $[\alpha]_D^{24}+132°$ (EtOH); $\lambda^{KBr}$ 4.49 and 5.76μ;

$\tau_{CDCl_3}^{TMS}$ 9.12 (s, 18-Me), 8.79 (s, 19-Me), 7.05 (s, 4-CH$_2$), and 5.75 (s, 1-CH$_2$)

*Analysis.*—Calc'd for C$_{19}$H$_{25}$NO$_3$ (315.40) (percent): C, 72.35; H, 7.99; N, 4.44. Found (percent): C, 72.29; H, 7.83; N, 4.44.

EXAMPLE 4

2,17a-dioxa-5β-cyano-D-homoandrostane-3,17-dione

A solution of 200 mg. of 2-oxa-5β-cyanoandrostane-3,17-dione in 3 ml. of methylene chloride is treated with 200 mg. of m-chloroperbenzoic acid and stirred at room temperature. After twenty-four hours, an additional 300 mg. of m-chloroperbenzoic acid is added. The mixture is stirred at room temperature for four days and then evaporated to dryness. Pate chromatography of the residue on silica gel using ethyl acetate as the developing solvent gives a major band detected with iodine. Elution with ethyl acetate, evaporation and crystallization from chloroform-isopropyl ether give 75 mg. of 2,17a-dioxa - 5β - cyano - D - homoandrostane - 3,17 - dione, M.P. 280–281°. The analytical sample is prepared by recrystallization from methanol; M.P. 282–283°; $\lambda^{KBr}$ 4.48, 5.72 and 5.80μ;

$\tau_{CDCl_3}^{TMS}$ 8.85 (s, 19-Me), 8.68 (s, 18-Me), 7.03 (s, 4-CH$_2$, and 5.73 (s, 1-CH$_2$)

*Analysis.*—Calc'd for C$_{19}$H$_{25}$NO$_4$ (331.40) (percent): C, 68.86; H, 7.60; N, 4.23. Found (percent): C, 69.10; H, 7.82; N, 4.23.

EXAMPLE 5

2-oxa-5β-cyano-17β-acetoxyandrostane-3-one

A solution of 135 mg. of 2-oxa-5β-cyano-17β-hydroxyandrostane-3-one in 0.5 ml. of acetic anhydride and 1.0 ml. of pyridine is left at room temperature for four hours. The mixture is diluted with water and the aqueous phase extracted with chloroform. The chloroform extracts are washed with 8% salt solution, dried and evaporated to dryness to give 2-oxa - 5β - cyano-17β-acetoxyandrostane -3-one.

The invention may be variously otherwise embodied within the scope of the appended claims.

What is claimed is:
1. A compound having the formula:

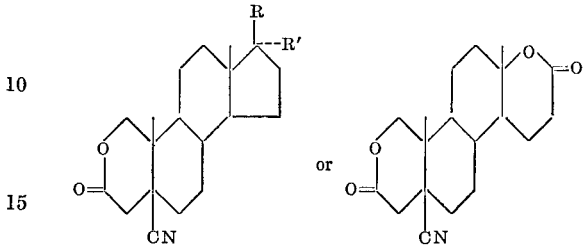

wherein R' is hydrogen; R is a hydroxy and acyloxy wherein the acyl is a hydrocarbon carboxylic acid of less than ten carbon atoms; and together R and R' is oxo (O=).

2. A compound in accordance with claim 1 having the name 2-oxa-5β-cyano-17β-hydroxyandrostane-3-one.

3. A compound in accordance with claim 1 having the name 2-oxa-5β-cyanoandrostane-3,17-dione.

4. A compound in accordance with claim 1 having the name 2,17a - dioxa - 5β - cyano-D-homoandrostane - 3,17-dione.

5. A compound in accordance with claim 1 having the name 2-oxa - 5β - cyano-17β-trifluoroacetoxyandrostane-3-one.

6. A compound in accordance with claim 1 having the name 2-oxa-5β-cyano-17β-acetoxyandrostane-3-one.

References Cited

UNITED STATES PATENTS 3,246,014   4/1966   Jung et al. _____ 260—343.2
3,282,962   11/1966  Pappo et al. _____ 260—343.2

HENRY R. JILES, Primary Examiner

J. M. FORD, Assistant Examiner

U.S. Cl. X.R.

260—999